United States Patent
Yang et al.

(10) Patent No.: US 11,978,888 B2
(45) Date of Patent: May 7, 2024

(54) CERIA-CARBON-SULFUR COMPOSITE, METHOD FOR PREPARING SAME, AND POSITIVE ELECTRODE AND LITHIUM-SULFUR BATTERY COMPRISING SAME

(71) Applicants: LG CHEM, LTD., Seoul (KR); SOGANG UNIVERSITY RESEARCH FOUNDATION, Seoul (KR)

(72) Inventors: Seungbo Yang, Daejeon (KR); Kwonnam Sohn, Daejeon (KR); Jun Hyuk Moon, Seoul (KR); Doo Kyung Yang, Daejeon (KR); Donghee Gueon, Seoul (KR); Jeong Tae Hwang, Daejeon (KR)

(73) Assignees: LG ENERGY SOLUTION, LTD., Seoul (KR); SOGANG UNIVERSITY RESEARCH FOUNDATION, Seoul (KR)

( * ) Notice: Subject to any disclaimer, the term of this patent is extended or adjusted under 35 U.S.C. 154(b) by 474 days.

(21) Appl. No.: 16/960,464

(22) PCT Filed: Mar. 13, 2019

(86) PCT No.: PCT/KR2019/002879
§ 371 (c)(1),
(2) Date: Jul. 7, 2020

(87) PCT Pub. No.: WO2019/177355
PCT Pub. Date: Sep. 19, 2019

(65) Prior Publication Data
US 2020/0343535 A1 Oct. 29, 2020

(30) Foreign Application Priority Data
Mar. 16, 2018 (KR) ........................ 10-2018-0030737

(51) Int. Cl.
*H01M 4/36* (2006.01)
*H01M 4/02* (2006.01)
(Continued)

(52) U.S. Cl.
CPC ......... *H01M 4/364* (2013.01); *H01M 4/0416* (2013.01); *H01M 4/0471* (2013.01);
(Continued)

(58) Field of Classification Search
CPC .. H01M 4/0416; H01M 4/0471; H01M 4/362; H01M 4/364; H01M 4/38;
(Continued)

(56) References Cited

U.S. PATENT DOCUMENTS 10,971,733 B2 * 4/2021 Dillard ................ H01M 4/1397
2012/0207994 A1 * 8/2012 Wang .................... H01M 4/362
264/618

(Continued)

FOREIGN PATENT DOCUMENTS

| CN | 101562261 A | 10/2009 |
| CN | 107293715 A | 10/2017 |

(Continued)

OTHER PUBLICATIONS

Lianbo Ma, ACS Nano 2017, 11, 7, 7274-7283 Publication Date:Jul. 6, 2017 https://doi.org/10.1021/acsnano.7b03227 Copyright © 2017 American Chemical Society (Year: 2017).*

(Continued)

*Primary Examiner* — Matthew T Martin
*Assistant Examiner* — Ankith R Sripathi
(74) *Attorney, Agent, or Firm* — Birch, Stewart, Kolasch & Birch, LLP (57) ABSTRACT

A ceria-carbon-sulfur ($CeO_2$—C—S) composite including a ceria-carbon ($CeO_2$—C) composite in which cylindrical carbon materials having ceria ($CeO_2$) particles bonded to (Continued)

surfaces thereof are entangled and interconnected to each other in three dimensions; and sulfur introduced into at least a portion of an outer surface and an inside of the ceria-carbon composite, a method for preparing the same, and positive electrode for a lithium-sulfur battery and a lithium-sulfur battery including the same.

6 Claims, 5 Drawing Sheets

(51) Int. Cl.
    *H01M 4/04*     (2006.01)
    *H01M 4/38*     (2006.01)

(52) U.S. Cl.
    CPC ............ *H01M 4/362* (2013.01); *H01M 4/38* (2013.01); *H01M 2004/021* (2013.01); *H01M 2004/028* (2013.01)

(58) Field of Classification Search
    CPC ........ H01M 4/48; H01M 4/583; H01M 4/625; H01M 10/052; H01M 10/0525; H01M 2004/021; H01M 2004/028
    See application file for complete search history.

(56) References Cited

U.S. PATENT DOCUMENTS

| | | | |
|---|---|---|---|
| 2015/0311489 A1 | 10/2015 | Park et al. | |
| 2020/0227725 A1* | 7/2020 | Joo | ................ H01M 4/663 |

FOREIGN PATENT DOCUMENTS

| | | |
|---|---|---|
| CN | 108417852 A | 8/2018 |
| KR | 10-2013-0098234 A | 9/2013 |
| KR | 10-2015-0124301 A | 11/2015 |
| KR | 10-2017-0142425 A | 12/2017 |

OTHER PUBLICATIONS

Liwen Ji et. al., Porous carbon nanofiber-sulfur composite electrodes for lithium/sulfur cells, 2011, Energy Environ. Sci, 4, 5053-5059 (Year: 2011).*
Guowing Li et. al., Three-dimensional porous carbon composites containing high sulfur nanoparticle content for high-performance lithium-sulfur batteries, 2016, Nature Communications, 7, article No. 10601 (Year: 2016).*
Gueon et al., "Spherical Macroporous Carbon Nanotube Particles with Ultrahigh Sulfur Loading for Lithium-Sulfur Battery Cathodes", ACS Nano, 2018, vol. 12, pp. 226-233.
Hao et al., "Three-Dimensional $S/CeO_2/RGO$ Composites as Cathode Materials for Lithium-Sulfur Batteries", Materials, 2018, vol. 11, 1720, total 13 pages.
International Search Report for PCT/KR2019/002879 dated Jun. 14, 2019.
Liang et al., "Hierarchically Structured Sulfur/Carbon Nanocomposite Material for High-Energy Lithium Battery", Chem. Mater., 2009, vol. 21, No. 19, pp. 4724-4730.
Manthiram et al., "Rechargeable Lithium-Sulfur Batteries", Chemical Reviews, 2014, vol. 114, pp. 11751-11787.
Qian et al., "$CeO_2$ nanodots decorated ketjen black for high performance lithium-sulfur battery", RSC Advances, 2016, vol. 6, pp. 111190-111196.
Xiao et al., "$CeO_2$-webbed carbon nanotubes as a highly efficient sulfur host for lithium-sulfur batteries", Energy Storage Materials, 2018, vol. 10, pp. 216-222.
Xie et al., "Ferroelectric-Enhanced Polysulfide Trapping for Lithium-Sulfur Battery Improvement", Advanced Materials, 2016, vol. 29, No. 6, 1604724, total 6 pages.
Yan et al., "Hydrothermal Synthesis of $CeO_2$ Nanoparticles on Activated Carbon with Enhanced Desulfurization Activity", Energy Fuels, 2012, vol. 26, pp. 5879-5886.
Extended European Search Report for European Application No. 19767567.1, dated Feb. 5, 2021.
Li et al., "Hollow Carbon Nanofibers Filled with $MnO_2$ Nanosheets as Efficient Sulfur Hosts for Lithium-Sulfur Batteries," Angewandte Chemie International Edition, vol. 54, 2015, pp. 12886-12890, 5 pages total.
Phokha et al., "Effects of CeO2 nanoparticles on electrochemical properties of carbon/CeO2 composites," Applied Surface Science, vol. 446, 2018, pp. 36-46, 11 pages total.

* cited by examiner

CERIA-CARBON-SULFUR COMPOSITE, METHOD FOR PREPARING SAME, AND POSITIVE ELECTRODE AND LITHIUM-SULFUR BATTERY COMPRISING SAME

TECHNICAL FIELD

This application claims priority to and benefits of Korean Patent Application No. 10-2018-0030737 filed on Mar. 16, 2018, the entire disclosure of which are incorporated herein by reference its entirety.

The present invention relates to a ceria-carbon-sulfur composite, a method for preparing the same, and a positive electrode and a lithium-sulfur battery comprising the same.

BACKGROUND ART

Recently, as the miniaturization and weight reduction of electronic products, electronic devices, communication devices, and the like are rapidly progressing and the need for electric vehicles has been greatly increased in relation to environmental problems, there is also a growing demand for performance improvements of secondary batteries used as power sources for these products. Among them, the lithium secondary battery has been attracting considerable attention as a high-performance battery because of its high energy density and high standard electrode potential.

The lithium-sulfur (Li—S) battery is a secondary battery using a sulfur-based material having a sulfur-sulfur bond (S—S bond) as a positive electrode active material and using lithium metal as a negative electrode active material. The lithium-sulfur battery has advantages in that sulfur, which is the main material of the positive electrode active material, is very rich in resources, is not toxic, and has a low atomic weight. In addition, theoretical discharge capacity of the lithium-sulfur battery is 1675 mAh/g-sulfur, and its theoretical energy density is 2,600 Wh/kg. Since the theoretical energy density of the lithium-sulfur battery is much higher than the theoretical energy density of other battery systems currently under study (Ni-MH battery: 450 Wh/kg, Li—FeS battery: 480 Wh/kg, Li—$MnO_2$ battery: 1,000 Wh/kg, Na—S battery: 800 Wh/kg), the lithium-sulfur battery is the most promising battery among the batteries developed so far.

During the discharging of the lithium-sulfur battery, an oxidation reaction of lithium occurs at the negative electrode and a reduction reaction of sulfur occurs at the positive electrode. Sulfur before discharging has an annular $S_8$ structure. During the reduction reaction (discharging), as the S—S bond is cut off, the oxidation number of S decreases, and during the oxidation reaction (charging), as the S—S bond is re-formed, electrical energy is stored and generated using an oxidation-reduction reaction in which the oxidation number of S increases. During this reaction, the sulfur is converted from the cyclic $S_8$ structure to the linear structure of lithium polysulfide ($Li_2S_x$, x=8, 6, 4, 2) by the reduction reaction and eventually, when the lithium polysulfide is completely reduced, lithium sulfide ($Li_2S$) is finally produced. By the process of reducing to each lithium polysulfide, the discharging behavior of the lithium-sulfur battery is characterized by a step-wise discharge voltage unlike the lithium ion battery.

However, in the case of lithium-sulfur battery, the problems of the low electrical conductivity of sulfur and the leaching and volume expansion of the lithium polysulfide during charging/discharging, resulting in the problems of low coulomb efficiency and rapid capacity reduction according to charging/discharging should be resolved.

In the prior art, in order to improve the lifetime characteristics of lithium sulfur battery, studies have been conducted to prevent the leaching of lithium polysulfide produced during charging and discharging, and typically, studies on the physical adsorption through the design of various pores and the chemical adsorption by the introduction of various oxides have been conducted. However, chemical absorbent materials such as metal oxides have low electrical conductivity, which results in the problem that the electrochemical properties are not fully expressed. Therefore, development is required to improve the lifetime and electrochemical characteristics of the battery.

PRIOR ART DOCUMENT

Patent Document

Chinese Patent Publication No. 108417852.

DISCLOSURE

Technical Problem

It is an object of the present invention to provide a ceria-carbon-sulfur composite wherein cerium precursors chemically grow into ceria particles on the surface of the cylindrical carbon material, so that releasing of ceria particles does not occur even in volume expansion due to charging/discharging of the lithium-sulfur battery and thus stability and excellent electrochemical characteristics of the electrode may be exhibited, and due to the hierarchical porosity structure of the ceria-carbon-sulfur composite, the electron transfer passage can be secured and the electron conductivity can be improved to exhibit excellent electrochemical characteristics.

It is another object of the present invention to provide a positive electrode comprising the ceria-carbon-sulfur composite and a lithium-sulfur battery comprising the positive electrode.

Technical Solution

In order to achieve the above objects, the present invention provides a ceria-carbon-sulfur ($CeO_2$—C—S) composite comprising:
- a ceria-carbon ($CeO_2$—C) composite in which cylindrical carbon materials having ceria ($CeO_2$) particles bonded to their surfaces are entangled and thus are interconnected to each other in three dimensions; and
- sulfur introduced into at least a portion of the outer surface and the inside of the ceria-carbon composite.

In addition, the present invention provides a method for preparing the ceria-carbon-sulfur ($CeO_2$—C—S) composite, comprising steps of:
(a) preparing a dispersion in which template particles and cylindrical carbon materials are mixed;
(b) spray-drying the dispersion to prepare template particle-carbon composites;
(c) heat-treating the template particle-carbon composites to prepare carbon agglomerates having a hierarchical porosity structure;
(d) preparing a mixed solution of the carbon agglomerates and cerium precursors;

(e) preparing a ceria-carbon ($CeO_2$—C) composite through a hydrothermal reaction by heating the mixed solution and then adding an acid; and (f) impregnating the ceria-carbon composite with sulfur to prepare a ceria-carbon-sulfur composite.

In addition, the present invention provides a positive electrode for a lithium-sulfur battery comprising the ceria-carbon-sulfur composite of the present invention.

In addition, the present invention provides a lithium-sulfur battery comprising the positive electrode of the present invention; a negative electrode; a separator interposed between the positive electrode and the negative electrode; and an electrolytic solution.

Advantageous Effects

When the ceria-carbon-sulfur composite of the present invention is applied to the positive electrode material of the lithium-sulfur battery, the releasing of ceria particles does not occur even in the volume expansion due to the charging/discharging of the lithium-sulfur battery, so that stability of the electrode, and lifetime and electrochemical characteristics of the electrode can be improved.

Also, due to the hierarchical porosity structure of the ceria-carbon-sulfur composite, the specific surface area can be increased to secure electron transfer passage, and the electron conductivity can be improved to improve the electrode capacity.

BEST MODE

Hereinafter, the present invention will be described in more detail.

Ceria-Carbon-Sulfur ($CeO_2$—C—S) Composite

The present invention relates to a ceria-carbon-sulfur ($CeO_2$—C—S) composite comprising a ceria-carbon ($CeO_2$—C) composite in which cylindrical carbon materials with ceria ($CeO_2$) particles bonded to its surface are entangled with each other and thus interconnected in three dimensions; and sulfur introduced into at least a portion of the outer surface and the inside of the ceria-carbon composite.

In the present invention, the cylindrical carbon materials are entangled with each other and interconnected in three dimensions, and thus form a carbon agglomerate having a hierarchical porosity structure composed of aligned pores. Therefore, the ceria-carbon composite means that a ceria particle is bonded to the surface of a cylindrical carbon material forming a carbon agglomerate having the hierarchical porosity structure, and the ceria particle is formed by chemically growing a cerium precursor on the surface of the cylindrical carbon material.

In the present invention, the hierarchical porosity structure refers to a structure having pores in which the pores are aligned so as to be three-dimensionally interconnected.

At this time, the three-dimensional structure can mean that the intersections where two or more strands intersect are distributed in three dimensions.

In addition, the three-dimensional structure can mean that each of basic units entangled in two dimensions is entangled again in three dimensions and thus finally has a three-dimensional structure. The term "entangled" may mean that more than two strands cross with each other through physical contact.

In the present invention, the cylindrical carbon materials aggregate to form a carbon agglomerate with a hierarchical porosity structure, wherein the carbon agglomerate essentially contains template particles of a predetermined size or larger, preferably macropores in its inside, and has a structure in which the macropores are well aligned and interconnected.

The macropores are formed through the removal of template particles, which will be described later, in which carbon materials having a cylindrical shape coagulate to form pores.

The cylindrical carbon material refers to a carbon material having a rod type grown in one direction or a cylindrical structure having an empty inside, which are not spherical particles or flakes. This cylindrical structure, rather than spherical particles, can easily form macro-pores aligned in one direction. In other words, the spherical carbon materials (e.g., carbon black, etc.) rather than the cylindrical carbon materials may be considered as the raw materials for producing the carbon agglomerate, but the use of the spherical carbon materials is not easy to form macro-pores that are three dimensionally interconnected and well aligned In the present invention, the cylindrical carbon material may be at least one selected from the group consisting of carbon nanotube (CNT), graphite nanofiber (GNF), carbon nanofiber (CNF), and activated carbon fiber (ACF), and more preferably may be carbon nanotube. In addition, both single-wall carbon nanotubes (SWCNT) and multi-wall carbon nanotubes (MWCNT) can be used as the carbon nanotube, and the carbon nanotube has one or more shapes selected from the group consisting of a spherical type, an entangled type, and a bundle type depending on the preparing method.

The carbon agglomerate has a net structure in which a plurality of cylindrical carbon materials are cross-linked or entangled with each other, and is a spherical or elliptical particle having a hierarchical porosity structure composed of aligned pores, and the diameter of the cross-section of each of the cylindrical carbon materials constituting the carbon agglomerate may be 1 to 100 nm, specifically 1 to 50 nm, more specifically 1 to 10 nm.

The use of the carbon agglomerate having the hierarchical porosity structure improves the penetration ability of the electrolyte and can delay the releasing time of the lithium polysulfide during charging/discharging.

The ceria particles are formed on the surface of the cylindrical carbon material by chemical growth of the cerium precursor. In the present invention, the ceria particles are chemically grown on the surface of a cylindrical carbon material by using a cerium precursor instead of being physically mixed with a carbon agglomerate, so that they are not vulnerable to releasing.

The chemical growth is carried out by hydrothermal reaction by adding an acid to the carbon agglomerate and the cerium precursor. The acid is used to adjust the pH so that the cerium precursor becomes a ceria particle. In the present invention, the kind of the acid is not particularly limited, but may specifically comprise, for example, at least one selected from the group consisting of hydrochloric acid, 6-aminohexanoic acid, nitric acid and acetic acid.

The diameter of the ceria particles is 10 to 30 nm, preferably 10 to 20 nm. If the diameter of the ceria particles is 10 nm to 30 nm, the surface area is increased, and thus the effects of improving the chemical adsorption ability with lithium polysulfide and the lifetime characteristics of the battery may be exhibited.

In addition, the ceria particles are contained in an amount of 10 to 50 wt. %, preferably 10 to 30 wt. %, based on the total weight of the ceria-carbon composite. If the ceria particles are contained in an amount of 10 to 50 wt. %, excellent electrical conductivity and electrochemical characteristics can be exhibited.

The average diameter of the ceria-carbon composites is 3 to 10 μm, preferably 4 to 7 μm. In the present invention, the diameter of the ceria-carbon composites means the largest value among diameters of the cross-section of the composite. If the diameter of the ceria-carbon composites is less than 3 μm, the hierarchical pore distribution is not widely distributed, so that it is difficult to secure the specific surface area to impregnate sulfur. If the diameter of the ceria-carbon composites exceeds 10 μm, the uniformity of the electrode is lowered and at the same time, a large amount of pores is generated between the particles, thereby reducing the sulfur content and reducing the contact area with the current collector.

In the present invention, as described above, since the ceria-carbon composite is formed by chemically growing ceria particles using a cerium precursor, on the surface of cylindrical carbon materials which forms a carbon agglomerate having a hierarchical porosity structure comprising aligned pores, the ceria particles can maintain the hierarchical porosity in the carbon agglomerate without blocking it and thus the ceria-carbon composite of the present invention has a hierarchical porosity structure.

The pores are macropores having a diameter of greater than 50 nm. Specifically, the macropores have a diameter of 300 to 800 nm, preferably 500 to 600 nm. Especially, as macropores are aligned in one direction, electron tunneling and electron paths are possible on the surface and inside of ceria-carbon-sulfur composite particles.

In addition, as the macropores are present, it is possible to facilitate the impregnation of sulfur and electrolyte penetration, thereby securing a capacity characteristic at a high C-rate.

The porosity of the ceria-carbon composite is 10 to 60%, preferably 10 to 30%. If the porosity of the ceria-carbon composite is less than 10%, mixing of the ceria-carbon composite and sulfur is not easy. If the porosity exceeds 60%, the electrode stability may be reduced.

The porosity of the ceria-carbon composite means an increase in specific surface area. Specifically, the ceria-carbon composite of the present invention has a specific surface area measured by the BET method of 50 to 700 m$^2$/g, preferably 100 to 400 m$^2$/g, more preferably 150 to 250 m$^2$/g.

In general, when ceria particles and carbon agglomerate are physically mixed, ceria particles may block the pores of carbon agglomerate. However, in the present invention, the ceria particles are bonded to the surface of the cylindrical carbon material without blocking the pores of the carbon agglomerate.

The ceria particles have high chemical adsorption ability with lithium polysulfide. Since the ceria-carbon composite is formed by chemically growing ceria particles using the cerium precursor on the surface of the cylindrical carbon material as described above, there is strong bonding force between the cylindrical carbon material and the ceria particle. Therefore, when applied to a lithium-sulfur battery, the ceria particles are not removed from the cylindrical carbon material even when the volume expansion of about 80% or less occurs due to repetitive charging/discharging of the lithium-sulfur battery, so that the lithium polysulfide can be adsorbed even in repetitive charging/discharging, thereby improving the stability and the lifetime of the battery.

In addition, sulfur is introduced into at least a part of the outer surface and the inside of the ceria-carbon composite to form a ceria-carbon-sulfur composite.

The sulfur which can be used in the present invention may be various sulfur used in lithium-sulfur battery and comprises elemental sulfur ($S_8$), a sulfur-based compound or a mixture thereof. The sulfur-based compound may be selected from the group consisting of a catholyte in which solid $Li_2S_n$ (n=1) is dissolved, an organic sulfur compound and a carbon-sulfur polymer [$(C_2S_x)_n$: x=2.5 to 50, n=2].

The ceria-carbon-sulfur composite can support sulfur in a high content due to pores of various sizes and three-dimensionally interconnected and regularly aligned pores within the structure. Therefore, even when soluble lithium polysulfides are produced by electrochemical reaction, if the lithium polysulfides can be located inside the ceria-carbon-sulfur composite, the phenomenon of collapse of the positive electrode structure can be suppressed due to maintenance of the entangled structure in three dimensions even during leaching of polysulfide. As a result, the lithium-sulfur battery comprising the ceria-carbon-sulfur composite has an advantage that a high capacity can be realized even at high loading. The loading amount of sulfur of the ceria-carbon-sulfur composite according to the present invention may be 1 to 7 mg/cm$^2$.

The weight ratio of the ceria-carbon composite and sulfur or sulfur compounds in the ceria-carbon-sulfur composite is 9:1 to 1:9, preferably 5:5 to 1:9. If the content of sulfur or sulfur compounds is less than the above range, the content of the ceria-carbon composite is increased. As the content of carbon is increased, the specific surface area is increased and thus the amount of binder added during slurry preparation must be increased. An increase in the amount of the added binder may eventually result in an increase in the sheet resistance of the electrode and may act as an insulator to prevent electron migration, and thus may degrade the cell performance. If the content of sulfur or sulfur compounds exceeds the above range, sulfur or sulfur compounds not associated with the ceria-carbon composite are agglomerated between them or are re-leached to the surface of the ceria-carbon composite, and thus it may be difficult for the sulfur or sulfur compounds to accept electrons, thereby making it difficult for the sulfur or sulfur compounds to participate directly in the electrode reaction.

Preparation Method of Ceria-Carbon-Sulfur Composite

The method for preparing the ceria-carbon-sulfur ($CeO_2$—C—S) composite of the present invention comprises:
(a) preparing a dispersion in which template particles and cylindrical carbon materials are mixed;
(b) spray-drying the dispersion to prepare template particle-carbon composites;
(c) heat-treating the template particle-carbon composites to prepare carbon agglomerates having a hierarchical porosity structure;
(d) preparing a mixed solution of the carbon agglomerates and cerium precursors;
(e) preparing ceria-carbon ($CeO_2$—C) composites through a hydrothermal reaction by heating the mixed solution and then adding an acid; and
(f) impregnating the ceria-carbon composite with sulfur to prepare a ceria-carbon-sulfur composite.

The step (a) is a step of preparing a dispersion in which template particles and cylindrical carbon materials are mixed.

The cylindrical carbon material may be at least one selected from the group consisting of carbon nanotube (CNT), graphite nanofiber (GNF), carbon nanofiber (CNF), and activated carbon fiber (ACF), and more preferably may be carbon nanotube, as mentioned above. In addition, the carbon nanotube may specifically be single-wall carbon nanotubes (SWCNT) or multi-wall carbon nanotubes (MWCNT).

The template particle acts as a template to form macropores in the carbon agglomerate. In other words, the template particles with macroscopic particle sizes are dispersed in dispersion, self-assembled due to the unique characteristics of nanoparticles to align in a lattice form, and the cylindrical carbon material is filled between these lattice spaces. The template particles are then removed through a subsequent heat treatment process and pores are formed at these moved locations. At this time, due to the characteristic of the long particle in one direction of the cylindrical carbon material, the pores formed after removal of the template particles have hierarchical porosity structures of three dimensionally interconnected structures even while forming well-aligned macropores.

Any usable template particles can be used as long as they are routinely usable in this field, especially if they can be removed by a heat treatment process.

Non-limiting examples of template particles that can be used in the present invention may be selected from the group consisting of polystyrene, polymethyl methacrylate, polyphenylmethacrylate, polyacrylate, polyalphamethylstyrene, poly(1-methylcyclohexylmethacrylate), polycyclohexylmethacrylate, polybenzylmethacrylate, polychlorobenzylmethacrylate, poly(1-phenylcyclohexylmethacrylate), poly(1-phenylethylmethacrylate), polyfurfurylmethacrylate, poly(1,2-diphenylethylmethacrylate), polypentabromophenylmethacrylate, polydiphenylmethylmethacrylate, polypentachlorophenylmethacrylate, copolymers thereof and combinations thereof, and preferably, polystyrene can be used.

Particularly, since the macropores are formed by removing the template particles, the size of macropores formed in the carbon agglomerate of the present invention can be determined by the particle size of the template particles. Accordingly, in consideration of the size of macropores, the template particles having a particle diameter of 50 nm or more, preferably 300 to 800 nm, more preferably 500 to 600 nm, are used.

In addition, since the porosity and specific surface area of the carbon agglomerate are influenced by the content of the template particles, the cylindrical carbon material and the template particles are mixed at a weight ratio of 1:1 to 1:5, preferably 1:2 to 1:4. If the weight ratio is less than the above range, when inversely calculated by the density, 70 wt. % or more of sulfur cannot be contained in the carbon material. If the weight ratio exceeds the above range, there is a problem that the strength of the structure itself including the excessive pores is weakened, which makes it difficult to maintain the electrode structure.

The dispersion medium used for preparing a dispersion of the above-mentioned cylindrical carbon materials and template particles is at least one selected from distilled water, alcohol, benzene, toluene, pyridine, acetone, tetrahydrofuran (THF) and dimethyl formamide (DMF), but preferably, the aqueous dispersion can be prepared by applying distilled water.

At this time, the concentration of the dispersion can be controlled by various parameters. However, for ease of application to a spraying apparatus and rapid drying while facilitating the removal of the dispersion medium, the dispersion contains the cylindrical carbon materials at a concentration of 10 to 50 g/L. Further preferably, the dispersion contains the cylindrical carbon materials at a concentration of 10 to 30 g/L.

The step (b) is a step of spray-drying the dispersion prepared in the step (a) to prepare a template particle-carbon composite.

The spray-drying method used according to an embodiment of the present invention can be performed by supplying the precursor dispersion into a spraying apparatus and then spraying it to form droplets, and drying the droplets. At this time, the spray-drying apparatus may include, but is not limited to, a spraying apparatus (droplet generating apparatus), a reactor, and a collecting section.

At this time, the spray-drying can be performed by a method of spraying at room temperature/normal pressure, spraying under pressure or electrostatic-spraying, and is not particularly limited in the present invention. For example, the spraying under pressure is a method of spraying a dispersion through a pressurized sprayer to form a droplet, and then producing a particle through a diffusion drier. In addition, the electrostatic spraying is a method of forming a droplet through an electrostatic spray nozzle using a high voltage generator, and then manufacturing particles through a diffusion drier.

According to the present invention, a spray drying method can produce a hierarchical porosity structure by a single process, and it is easy to control the specific surface area and average pore size of carbon agglomerate according to processing conditions.

According to an embodiment of the present invention, droplets having an average diameter of 0.5 to 100 μm can be formed by the spray, and the dispersion medium contained in the droplets can be removed by the drying. The diameter of the droplets is preferably in the range of 0.5 to 100 μm, more preferably in the range of 5 to 30 μm. If the diameter of the droplet is less than 0.5 μm, the size of the generated carbon agglomerate may be too small. If the diameter of the droplet exceeds 100 μm, there is a problem that the size of the generated carbon agglomerate may be too large.

The drying process is not particularly limited as long as the temperature is above the temperature for conversion of the material constituting the droplet into a particle (i.e., agglomerate), and preferably carried out by heat treatment at a temperature ranging from 50 to 180° C., more preferably from 60 to 150° C., at which the dispersion medium can be sufficiently removed. At this time, the drying temperature may vary depending on the dispersion medium used.

The dried template particle-carbon composite is obtained in the form of particles (powder) and is recovered through a collector to remove the template particles.

The step (c) is a step of preparing a carbon agglomerate of a hierarchical porosity structure by heat-treating the template particle-carbon composite prepared in the step (b).

Through the heat treatment, template particles can be removed to produce a carbon agglomerate of a hierarchical porosity structure comprising aligned pores.

The heat treatment temperature can be selected within a range of temperatures capable of removing template particles used, and the heat treatment time is not particularly limited, but is appropriately selected within a time range sufficient for removing all the template particles. For example, the heat treatment temperature may be in the range of 600 to 1200° C., preferably 700 to 1100° C., more preferably 800 to 1000° C., and the heat treatment time may be 1 hour or more, and specifically in the range of 1 to 10 hours, but is not limited thereto.

At this time, the heat treatment may be performed in an inert atmosphere containing no oxygen, that is, an atmosphere containing an inert gas such as helium, neon, or argon, hydrogen, nitrogen, or $SF_6$ gas, and the template particles may be removed through heat treatment in the inert atmosphere, but the present invention is not limited thereto.

The carbon agglomerate thus prepared may be subjected to a dry ball mill method, a dry jet mill method or a dry dynomill method, if necessary, in order to make the particle size uniform, a specific method may be a method commonly used in this field.

The step (d) is a step of preparing mixed solution of the carbon agglomerate prepared in step (c) and a cerium precursor.

The type of the cerium precursor is not particularly limited, but $Ce(NO_3)_3 \cdot 6H_2O$ is used in an embodiment of the present invention.

The solvent for mixing the carbon agglomerate and the cerium precursor is not particularly limited as long as it can dissolve the cerium precursor, and distilled water can be preferably used.

The step (e) is a step of preparing a ceria-carbon ($CeO_2$—C) composite by hydrothermal reaction after heating the mixed solution prepared in the step (d) and adding an acid.

The hydrothermal reaction may be carried out at 70 to 150° C., preferably at 80 to 120° C. If the temperature is lower than 70° C., the reaction may not start or the reaction rate may be too slow to form ceria particles. If the temperature exceeds 150° C., bulk particles having a size exceeding the nanometer level may be non-uniformly formed.

The cerium ions contained in the mixed solution are converted into ceria particles through a hydrothermal reaction by adding an acid to the mixed solution while maintaining the heating temperature, and the reaction may be performed for 4 to 12 hours.

The acid serves to adjust the pH so that cerium ions can be converted into ceria particles, and the preferred pH range in the present invention is 2 to 7.

In addition, the type of the acid is not particularly limited, but specifically may include, for example, at least one selected from the group consisting of hydrochloric acid, 6-aminohexanoic acid, nitric acid and acetic acid.

The ceria particles chemically grow on the surface of the cylindrical carbon material that constitutes the carbon agglomerate. The diameter of the ceria particles is 10 to 30 nm, preferably 10 to 20 nm.

After the reaction of adding the acid, it is washed several times using distilled water, ethanol, or the like, followed by drying to obtain a ceria-carbon composite.

The ceria may be contained in an amount of 10 to 50 wt. %, preferably 10 to 30 wt. %, based on the total weight of the ceria-carbon composite.

In addition, the diameter of the ceria-carbon composites is 3 to 10 µm, preferably 4 to 7 µm. In the present invention, the diameter of the ceria-carbon composites means the largest value among diameters of the cross-section of the composite. If the diameter of the ceria-carbon composites is less than 3 µm, the hierarchical pore distribution is not widely distributed, so that it is difficult to secure the specific surface area to impregnate sulfur. If the diameter of the ceria-carbon composites exceeds 10 µm, the uniformity of the electrode is lowered and at the same time, a large amount of pores are generated between the particles, thereby reducing the sulfur content and reducing the contact area with the current collector.

The pores of the ceria-carbon composite are macropores. Specifically, the macropores are 300 to 800 nm, preferably 500 to 600 nm.

In addition, the porosity of the ceria-carbon composite is 10 to 60%, preferably 10 to 30%. If the porosity of the ceria-carbon composite is less than 10%, it is not easy to mix the ceria-carbon composite and sulfur. If the porosity exceeds 60%, the electrode stability may be decreased.

The porosity of the ceria-carbon composite means an increase in specific surface area. Specifically, the ceria-carbon composite of the present invention has a specific surface area measured by a BET method of 50 to 700 m$^2$/g, preferably 100 to 400 m$^2$/g, more preferably 150 to 250 m$^2$/g.

In step (f), the ceria-carbon-sulfur ($CeO_2$—C—S) composite is prepared by impregnating the ceria-carbon composite prepared in step (e) above with sulfur.

The impregnation of sulfur is not particularly limited in the present invention and can be carried out by a known method.

The step of impregnating the sulfur or sulfur compounds can be carried out by homogeneously mixing ceria-carbon composite with the sulfur or sulfur compound powder, heating the mixture and impregnating the ceria-carbon composite with the molten sulfur or sulfur compounds.

In that case, the sulfur or sulfur compounds can be impregnated by flowing into the surrounding ceria-carbon composite by capillary phenomenon.

The heating temperature may be 115 to 180° C., more specifically 150 to 160° C. According to one embodiment, an energy dispersive spectroscopy (EDS) analysis confirms that sulfur is uniformly coated around the ceria-carbon composite rather than the pores between ceria-carbon composites.

The heating time may be controlled depending on the content of sulfur or sulfur compounds and ceria-carbon composite, and may be, for example, 10 seconds or more, or 30 seconds or more, and 2 hours or less, 1 hour or less, 30 minutes or less, or 10 minutes or less.

If the melting temperature is lower than 115° C., the sulfur or sulfur compound particles may not be melted and thus the sulfur or sulfur compounds may not be properly impregnated into the ceria-carbon composite.

The step of impregnating the sulfur or sulfur compounds can be carried out by dissolving the sulfur or sulfur compounds in an organic solvent and then growing sulfur or sulfur compounds by adding the ceria-carbon composite.

The organic solvent may be one selected from the group consisting of ethanol, toluene, benzene, N-methyl-2-pyrrolidone (NMP), dimethylsulfoxide (DMSO), acetone, chloroform, dimethylformamide, cyclohexane, tetrahydrofuran and methylenechloride, or a mixed solvent of two or more thereof.

The step of impregnating the sulfur or sulfur compounds may be performed by mixing the ceria-carbon composite with the sulfur or sulfur compound powder and then impregnating by a ball mill method.

The mixing method may be carried out by putting it in a powder mixer for a predetermined time. In that case, the mixing time may be 10 minutes or more, or 30 minutes or more, and 10 hours or less, 5 hours or less, or 2 hours or less.

Positive Electrode for Lithium-Sulfur Battery

In addition, the present invention relates to a positive electrode for a lithium-sulfur battery comprising the ceria-carbon-sulfur composite of the present invention as described above.

The positive electrode is formed by applying and drying a composition for forming a positive electrode active material layer on a positive electrode current collector. The composition for forming the positive electrode active material layer may be prepared by mixing the above ceria-carbon-sulfur composite with a conductive material and a binder and drying at 40 to 70° C. for 4 hours to 12 hours.

Specifically, in order to impart additional electrical conductivity to the ceria-carbon-sulfur composite, a conductive material may be added to the positive electrode composition. The conductive material serves to cause electrons to move smoothly in the positive electrode, and is not particularly limited as long as it does not cause chemical changes in the battery and provides an excellent electrical conductivity and a large surface area, but preferably a carbon-based material is used.

The carbon-based material may be one selected from the group consisting of graphite such as natural graphite, artificial graphite, expanded graphite and graphene; active carbon; carbon blacks such as channel black, furnace black, thermal black, contact black, lamp black, and acetylene black; carbon fiber; carbon nano-structures such as carbon nanotube (CNT) and fullerene; and a combination thereof.

In addition to the carbon-based materials, metallic fiber such as metal mesh; metallic powder such as copper (Cu), silver (Ag), nickel (Ni), and aluminum (Al); or organic electrically conductive materials such as polyphenylene derivatives may also be used according to purpose. The electrically conductive materials may be used alone or in combination.

Also, in order to provide the positive electrode active material with the adhesion to the current collector, the positive electrode composition may further comprise a binder. The binder should be well dissolved in a solvent, and the binder not only has to constitute an electrically conductive network between the positive electrode active material and the conductive material, but also should have an appropriate impregnation property for the electrolyte solution.

The binder applicable to the present invention may be any binder known in the art, and specifically may be, but is not limited thereto, any one selected from the group consisting of fluororesin-based binders including polyvinylidene fluoride (PVdF) or polytetrafluoroethylene (PTFE); rubber-based binders including styrene-butadiene rubber, acrylonitrile-butadiene rubber, and styrene-isoprene rubber; cellulose-based binders including carboxymethylcellulose (CMC), starch, hydroxypropylcellulose, and regenerated cellulose; polyalcohol-based binders; polyolefin-based binders including polyethylene and polypropylene; polyimide-based binders; polyester-based binders; silane-based binders; acrylate-based binder or acrylate-based copolymer binder; and mixtures or copolymers of two or more thereof.

The content of the binder resin may be, but is not limited to, 0.5 to 30 wt. % based on the total weight of the positive electrode for the lithium-sulfur battery. If the content of the binder resin is less than 0.5 wt. %, the physical properties of the positive electrode may be degraded and thus the positive electrode active material and conductive material may be eliminated. If the content exceeds 30 wt. %, the ratio of the active material and the conductive material in the positive electrode is relatively reduced and thus the capacity of the battery can be reduced.

The solvent for making the positive electrode composition for the lithium-sulfur battery in slurry state should be easy to dry, and should dissolve the binder well, but a solvent capable of keeping the positive electrode active material and the conductive material in a dispersed state without dissolving them is most preferable. If the solvent dissolves the positive electrode active material, since the specific gravity (D=2.07) of sulfur in the slurry is high, there is a tendency that the sulfur is submerged in the slurry, which in turn causes sulfur to flow into the current collector during coating and cause problems with the electrically conductive network, thereby causing problems with regard to the operation of the battery.

The solvent according to the present invention may be water or an organic solvent. The organic solvent may be an organic solvent comprising at least one selected from the group consisting of dimethylformamide, isopropyl alcohol, acetonitrile, methanol, ethanol and tetrahydrofuran.

The mixing of the positive electrode composition can be carried out by a conventional method using a conventional mixer such as a paste mixer, a high-speed shear mixer, or a homo-mixer.

By applying the positive electrode composition to the current collector and vacuum-drying it, a positive electrode for the lithium-sulfur battery can be formed. The slurry can be coated on the current collector in an appropriate thickness depending on the viscosity of the slurry and the thickness of the positive electrode to be formed, and can be suitably selected within the range of 10 to 300 μm.

In that case, there is no limitation on the method of coating with the slurry, and examples thereof may include doctor blade coating, dip coating, gravure coating, slit die coating, spin coating, comma coating, bar coating, reverse roll coating, screen coating, and cap coating methods.

The drying condition for removing the solvent and water after the coating of the slurry is generally conducted at a temperature of 80° C. or less, which is incapable of volatilizing sulfur, and more specifically, the drying temperature is from 40 to 70° C., and the drying can usually proceed overnight.

The positive electrode current collector generally has a thickness of 3 to 500 μm and is not particularly limited as long as it has high conductivity without causing chemical change in the battery. For example, a conductive metal such as stainless steel, aluminum, copper, or titanium, etc., can be used as the positive electrode current collector, and preferably an aluminum current collector can be used. The positive electrode current collector may be formed in various forms such as film, sheet, foil, net, porous body, foam or nonwoven fabric.

Lithium-Sulfur Battery

In addition, the present invention provides a lithium-sulfur battery comprising a positive electrode; a negative electrode; a separator interposed between the positive electrode and the negative electrode; and an electrolytic solution wherein the positive electrode is the positive electrode of the present invention as described above.

Negative Electrode

The negative electrode has a form formed by laminating a negative electrode active material on the negative electrode current collector. If necessary, the negative electrode current collector can be omitted.

In that case, the negative electrode current collector is not particularly limited as long as it has electrical conductivity without causing chemical changes in the battery. For example, copper, stainless steel, aluminum, nickel, titanium, sintered carbon; copper or stainless steel surface-treated with carbon, nickel, titanium, silver or the like; aluminum-cadmium alloy or the like may be used as the negative electrode current collector. In addition, the shape of the negative electrode current collector can be various forms such as a film having or not having fine irregularities on its surface, sheet, foil, net, porous body, foam, nonwoven fabric and the like.

The lithium metal layer may be lithium metal or lithium alloy. In that case, the lithium alloy includes an element capable of alloying with lithium, wherein the element may be Si, Sn, C, Pt, Ir, Ni, Cu, Ti, Na, K, Rb, Cs, Fr, Be, Mg, Ca, Sr, Sb, Pb, In, Zn, Ba, Ra, Ge, Al, Co and alloys thereof.

The lithium metal layer may be a sheet or a foil. In some cases, the lithium metal layer may have a form in which lithium metal or lithium alloy is deposited or coated by a dry process on the current collector, or a form in which metal and alloy of a particle phase are deposited or coated by a wet process or the like.

Separator

A conventional separator can be interposed between the positive electrode and the negative electrode. The separator is a physical separator having a function of physically separating electrodes. Any separator can be used without any particular limitations as long as it is used as a conventional separator. Particularly, a separator with excellent electrolyte humidification ability while exhibiting low resistance to ion migration of electrolyte is preferable.

In addition, the separator enables the lithium ion to be transported between the positive electrode and the negative electrode while separating or insulating the positive electrode and the negative electrode from each other. Such separator may be made of a porous, nonconductive or insulating material. The separator may be an independent member such as a film, or a coating layer added to the positive electrode and/or the negative electrode.

Specifically, a porous polymer film, for example, a porous polymer film made of a polyolefin-based polymer such as ethylene homopolymer, propylene homopolymer, ethylene/butene copolymer, ethylene/hexene copolymer and ethylene/methacrylate copolymer, etc. may be used alone or in a laminate thereof, or a conventional porous nonwoven fabric, for example, a nonwoven fabric made of glass fiber, polyethylene terephthalate fiber or the like with high melting point can be used, but are not limited thereto.

Electrolyte

The electrolytic solution of the lithium-sulfur battery is a lithium salt-containing electrolytic solution, which may be an aqueous or non-aqueous electrolytic solution, and preferably is a non-aqueous electrolyte consisting of an organic solvent electrolyte solution and a lithium salt. In addition, organic solid electrolytes, inorganic solid electrolytes, and the like may be included, but are not limited thereto.

The non-aqueous organic solvent may be, for example, aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydroxy franc, 2-methyltetrahydrofuran, dimethylsulfoxide, 1,3-dioxolane, 4-methyl-1,3-dioxane, diethyl ether, formamide, dimethylformamide, dioxolane, acetonitrile, nitromethane, methyl formate, methyl acetate, triester phosphate, trimethoxymethane, dioxolane derivative, sulfolane, methylsulfolane, 1,3-dimethyl-2-imidazolidinone, propylene carbonate derivatives, tetrahydrofuran derivatives, ethers, methyl propionate, ethyl propionate and the like.

In that case, an ether-based solvent is used as the non-aqueous solvent, so as to be similar to the electrode protection layer of the present invention. Examples of the solvent comprise tetrahydrofuran, ethylene oxide, 1,3-dioxolane, 3,5-dimethyl isoxazole, 2,5-dimethyfuran, furan, 2-methylfuran, 1,4-dioxane, 4-methyldioxolane and the like.

In that case, an ether-based solvent is used as the non-aqueous solvent, so as to be similar to the electrode protection layer of the present invention. Examples of the solvent comprise tetrahydrofuran, ethylene oxide, 1,3-dioxolane, 3,5-dimethyl isoxazole, 2,5-dimethyfuran, furan, 2-methylfuran, 1,4-oxane, 4-methyldioxolane and the like.

The lithium salt is a substance which is easily soluble in the non-aqueous electrolyte. For example, the lithium salt may be $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, $(FSO_2)_2NLi$, $LiN(CF_3CF_2SO_2)_2$, lithium chloroborane, lithium lower aliphatic carboxylate, 4-phenyl lithium borate, or lithium imide, etc.

The concentration of the lithium salt may be 0.2 to 2 M, preferably 0.6 to 2 M, more preferably, 0.7 to 1.7 M depending on various factors such as the exact composition of the electrolyte mixture, the solubility of the salt, the conductivity of the dissolved salt, the charging and discharging conditions of the battery, the operating temperature and other factors known in the lithium battery field. If the concentration of the lithium salt is less than 0.2 M, the conductivity of the electrolyte may be lowered and thus the performance of the electrolyte may be deteriorated. If the concentration of the lithium salt exceeds 2 M, the viscosity of the electrolyte may increase and thus the mobility of the lithium ion (Lit) may be reduced.

The non-aqueous organic solvent should dissolve the lithium salt well, and the non-aqueous organic solvent of the present invention may include, for example, aprotic organic solvents such as N-methyl-2-pyrrolidone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydrofuran, 2-methyl tetrahydrofuran, dimethylsulfoxide, 1,3-dioxolane, 4-methyl-1,3-di oxane, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, and these organic solvents can be used alone or in a mixed solvent form of two or more solvents thereof.

As the organic solid electrolyte, for example, polyethylene derivatives, polyethylene oxide derivatives, polypropylene oxide derivatives, phosphate ester polymers, poly agitation lysine, polyester sulfide, polyvinyl alcohol, polyvinylidene fluoride, and polymers including ionic dissociation groups and the like can be used.

As the inorganic solid electrolyte of the present invention, for example, nitrides, halides, sulfates and the like of Li such as $Li_3N$, LiI, $Li_5NI_2$, $Li_3N$—LiILiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2SSiS_2$ may be used.

The shape of the lithium-sulfur battery as described above is not particularly limited and may be, for example, a jelly-roll type, a stack type, a stack-folding type (including a stack-Z-folding type), or a lamination-stacking type, and preferably a stack-folding type.

An electrode assembly in which the positive electrode, the separator, and the negative electrode are successively laminated is manufactured and then placed it in a battery case. Thereafter, a lithium-sulfur battery is manufactured by injecting an electrolyte solution into the upper part of the case and sealing it with a cap plate and a gasket.

The lithium-sulfur battery may be classified into a cylindrical shape, a square shape, a coin shape, a pouch shape, and the like depending on the shape, and may be divided into a bulk type and a thin film type depending on the size. The structure and manufacturing method of these batteries are well known in the art, and thus detailed description thereof will be omitted.

Hereinafter, Examples, Comparative Examples and Experimental Example will be described to help understand the effects of the present invention. However, the following description is only an example of the contents and effects of the present invention, and the scope and effect of the present invention are not limited thereto.

<Preparation of Ceria-Carbon-Sulfur Composite>

Example 1

An aqueous dispersion was prepared by mixing aqueous dispersion of multi-wall carbon nanotube (MWCNT, diameter: 10~20 nm) and polystyrene (PS, diameter: 500~600 nm) colloid solution with MWCNT:PS=1 g:3.5 g ratio.

Figure 1:
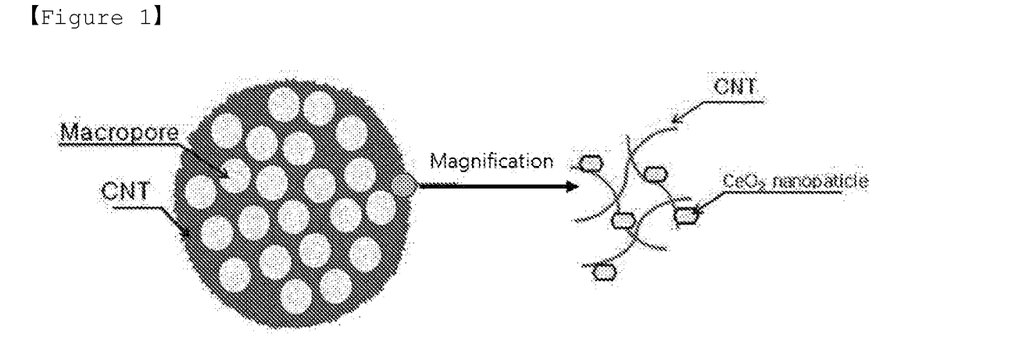
FIG. 1 is a schematic view showing the structure of the ceria-carbon composite of the present invention.
Figure 2:
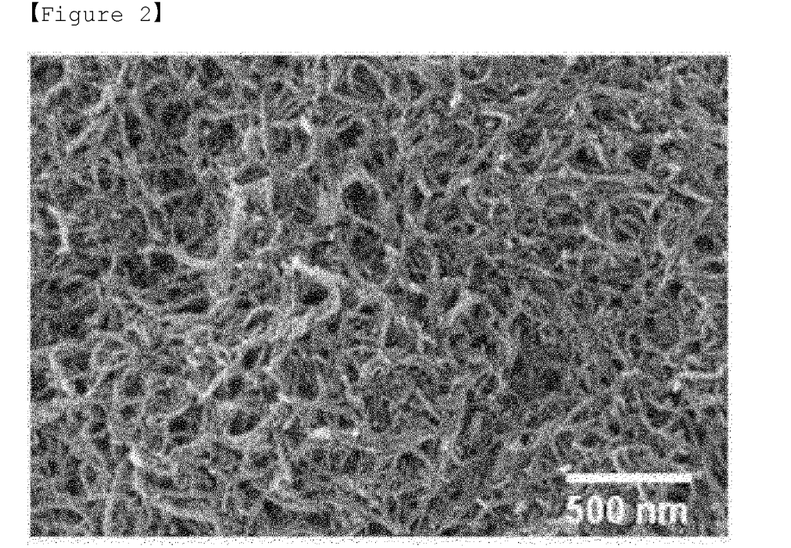
FIG. 2 is a SEM photograph of the surface of the carbon agglomerate having a hierarchical porosity structure of the present invention.

Polystyrene-carbon nanotube (PS-MWCNT) composites were prepared by spray-drying (Labplant, SD-Basic) the dispersion at 140° C. The PS-MWCNT composite was recovered and then polystyrene was removed by heat treatment at 500° C. for 2 hours in argon (Ar) atmosphere to produce a carbon nanotube agglomerate having a hierarchical porosity structure (FIG. 2).

0.45 g of the obtained carbon nanotube agglomerate and 0.9 g of $Ce(NO_3)_3 \cdot 6H_2O$ were added to distilled water and heated to a temperature of 95° C. While keeping the above temperature, 1.75 g of 6-aminohexanoic acid and 0.07 mL of hydrochloric acid were added and hydrothermal synthesis was conducted for 5 hours.

Figure 3:
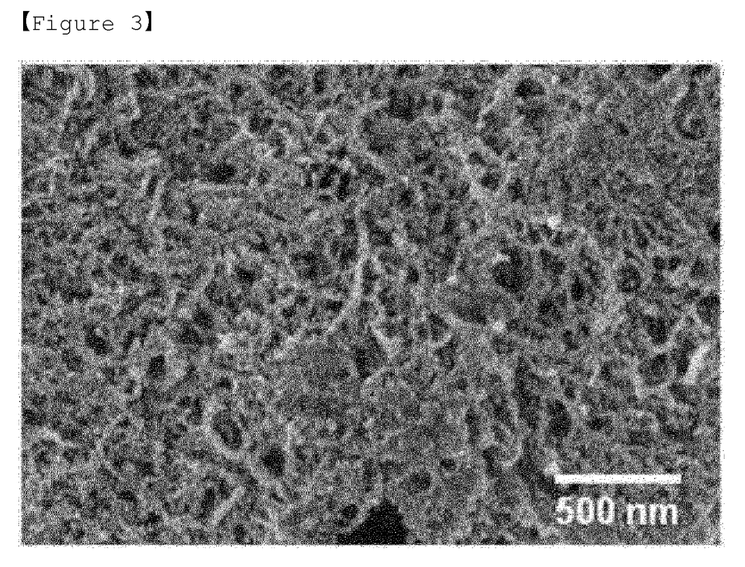
FIG. 3 is a SEM photograph of the surface of the ceria-carbon composite of the present invention.
Figure 4:
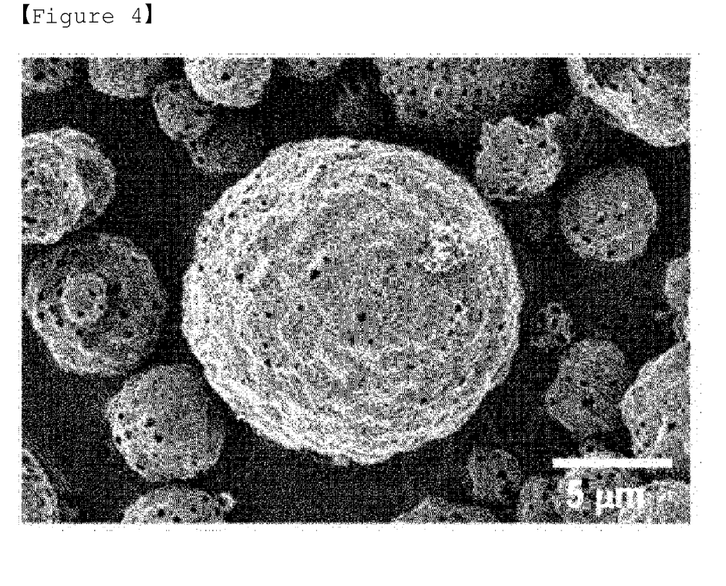
FIG. 4 is a SEM photograph of the ceria-carbon composite of Example 1.
Figure 6:
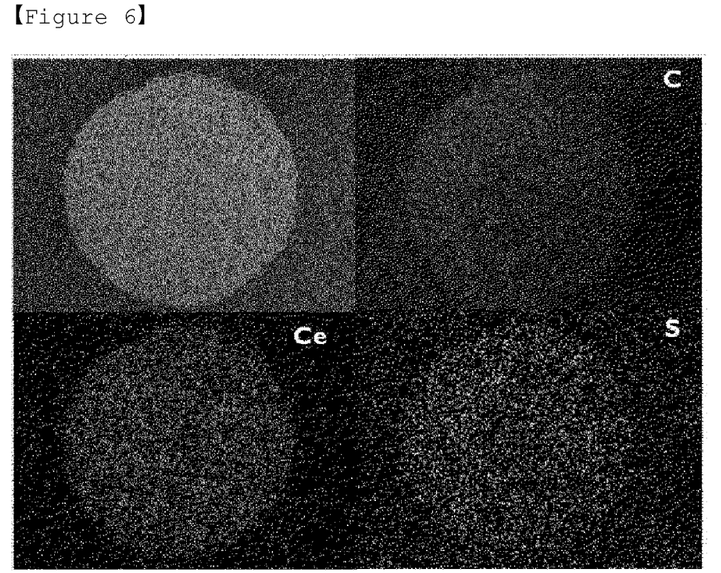
FIG. 6 is an EDX photograph of the ceria-carbon-sulfur composite taken during the manufacturing process of Example 1.

After completion of the synthesis, the mixed solution was washed several times with distilled water and ethanol, and then dried in an oven to obtain a ceria-carbon composite having ceria particles bonded to the surface of a multi-wall carbon nanotube, which has a hierarchical porosity structure (FIGS. 3, 4 and 6).

The ceria-carbon composite and sulfur were mixed at a weight ratio of 3:7 and then melt-diffused at 155° C. for 12 hours to prepare a ceria-carbon-sulfur composite.

Figure 7:
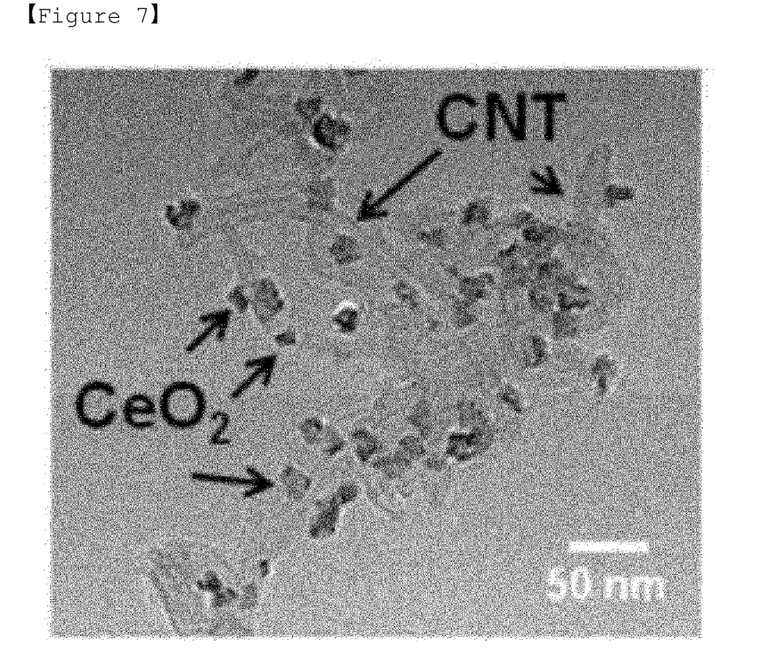
FIG. 7 is a TEM photograph of ceria particles grown on the surface of the carbon nanotube of Example 1.
Figure 8:
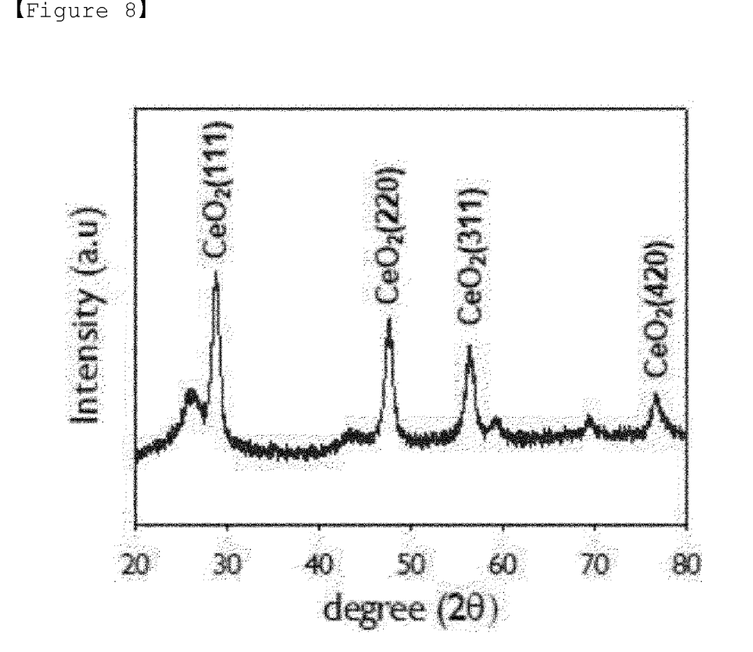
FIG. 8 is an XRD graph of the ceria-carbon composite of Example 1.

Additionally, as a result of observing the carbon nanotube of the ceria-carbon composite, it was confirmed that ceria particles with diameters of about 10 to 20 nm were bonded to the surface of the carbon nanotubes (FIG. 7), and a result of the X-ray diffraction (XRD) analysis, nano particles formed on the surface of the carbon nanotube were ceria particles (FIG. 8).

Comparative Example 1

A aqueous dispersion was prepared by mixing a aqueous dispersion of ceria ($CeO_2$) nano particles (diameter 25 nm) and multi-wall carbon nanotubes (MWCNT, diameter: 10-20 nm) and a polystyrene (PS, diameter: 500~600 nm) colloid solution with $CeO_2$+MWCNT:PS=1 g:3.5 g ratio.

Ceria-polystyrene-carbon nanotube($CeO_2$-PS-MWCNT) composites were prepared by spray-drying (Labplant, SD-Basic) the dispersion at 140° C.

Figure 5:
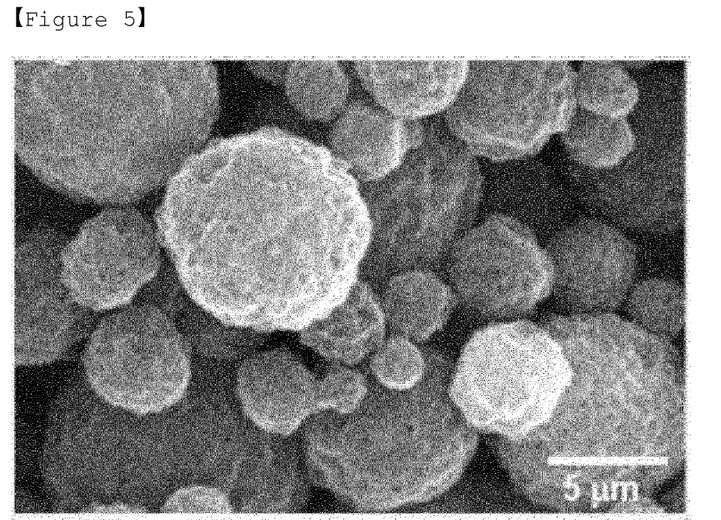
FIG. 5 is a SEM photograph of the ceria-carbon composite of Comparative Example 1.

After recovering the $CeO_2$—PS-MWCNT composite, the polystyrene was removed by heat-treating at 500° C. for 2 hours in an argon (Ar) atmosphere to prepare ceria-carbon composite which is a simple mixture of ceria particles and multi-wall carbon nanotubes, and it was confirmed that pores were hardly formed in the ceria-carbon composite (FIG. 5).

A ceria-carbon-sulfur composite was prepared by mixing the ceria-carbon composite and sulfur in a weight ratio of 3:7, followed by melt diffusion at 155° C. for 12 hours.

<Preparation of Lithium-Sulfur Battery>

Example 2

A mixture of the ceria-carbon-sulfur composite prepared in Example 1, a conductive material and a binder in a weight ratio of 8:1:1 was dissolved in distilled water to prepare a positive electrode active material slurry, and then coated on a current collector of aluminum foil having a thickness of 20 µm to prepare a positive electrode.

Carboxy methyl cellulose (CMC) was used as the conductive material, and styrene butylene rubber (SBR) was used as a binder.

A lithium-sulfur battery coin cell was fabricated using polyethylene as a separator and lithium foil with a thickness of 45 µm as a negative electrode. At this time, a coin cell was prepared using an electrolyte solution prepared by dissolving 1 M LiFSI and 0.5 M $LiNO_3$ in a mixed solvent of diethylene glycol dimethyl ether and 1,3-dioxolane in a volume ratio of 1:1.

Comparative Example 2

A lithium-sulfur battery was prepared in the same manner as in Example 2 except that the ceria-carbon-sulfur composite prepared in Comparative Example 1 was used.

Experimental Example 1. Electrochemical Characterization of Lithium-Sulfur Battery The electrochemical properties of the lithium-sulfur batteries prepared in Example 2 and Comparative Example 2 were characterized.

Figure 9:
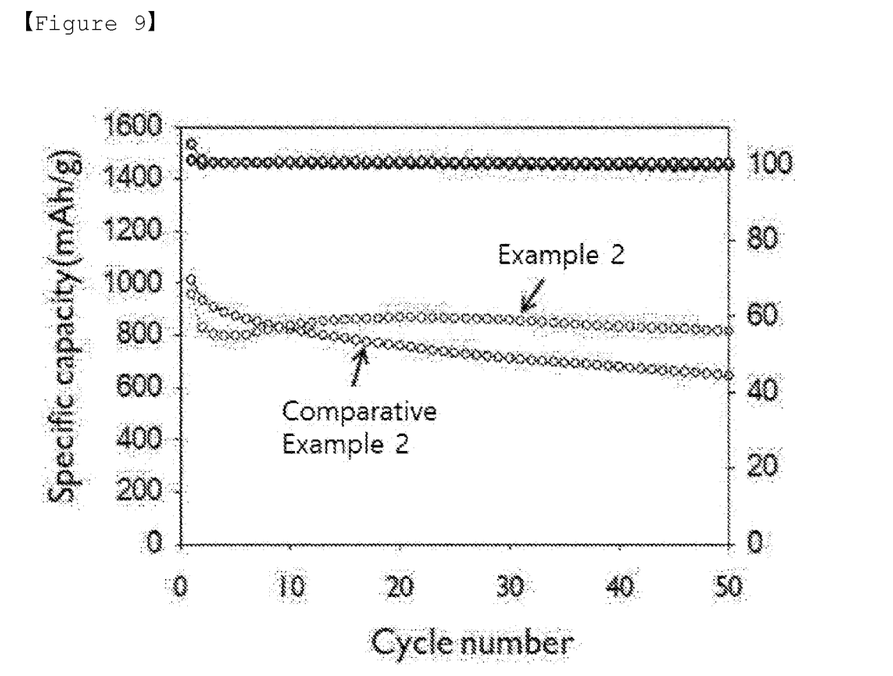
FIG. 9 is a graph of capacity characteristics and Coulon efficiency of lithium-sulfur batteries of Example 2 and Comparative Example 2.

Capacitance characteristics and Coulomb efficiency were measured at charging/discharging voltage range of 1.5 to 2.8 V, discharge C-rate of 1 C, and charge C-rate of 1 C, and the results are shown in Table 1 and FIG. 9

TABLE 1

| | Initial capacity (mAh/g) | Capacity after 50 cycle (mAh/g) | Coulomb efficiency (%) |
|---|---|---|---|
| Example 2 | 958 | 815 | 100 |
| Comparative Example 2 | 1011 | 645 | 99.6 |

From the results of Table 1, it was confirmed that the lithium-sulfur battery of Example 2 including the ceria-carbon-sulfur composite of Example 1 of the present invention retains some initial capacity even after 50 cycles. However, the lithium-sulfur battery of Comparative Example 2 containing the ceria-carbon-sulfur composite of Comparative Example 1 showed a capacity reduction of about 40% or more after 50 cycles.

Therefore, it was confirmed that the lithium-sulfur battery comprising the ceria-carbon-sulfur composite of the present invention has excellent lifetime characteristics of the battery.

The invention claimed is:

1. A ceria-carbon-sulfur composite comprising:
   a ceria-carbon composite comprising cylindrical carbon materials entangled with each other and interconnected in three dimensions, forming a carbon agglomerate having a hierarchical porosity structure composed of aligned pores, and wherein a ceria particle is bonded to the surface of the carbon agglomerate; and
   sulfur, which is introduced into at least a portion of an outer surface and an inside of the ceria-carbon composite,
   wherein a porosity of the ceria-carbon composite is 10% to 60%, and a total BET specific surface area of the ceria-carbon composite is 50 m²/g to 700 m²/g,
   wherein the pores are macropores having a diameter of 300 nm to 800 nm, and
   wherein the cylindrical carbon material comprises at least one selected from the group consisting of a carbon nanotube, a graphite nanofiber, a carbon nanofiber, and an activated carbon fiber,
   wherein the ceria particles maintain the hierarchical porosity in the carbon agglomerate without blocking it,
   wherein an average diameter of the ceria-carbon composite is 3 μm to 10 μm,
   wherein the ceria particles are formed by chemical growth on the surfaces of the cylindrical carbon materials from a cerium precursor, and
   wherein the chemical growth is carried out by hydrothermal reaction with addition of an acid.

2. The ceria-carbon-sulfur composite of claim 1, wherein diameter of the ceria particles ranges from 10 nm to 30 nm.

3. The ceria-carbon-sulfur composite of claim 1, wherein the ceria particles are present in an amount of 10 wt. % to 50 wt. % based on a total weight of the ceria-carbon composite.

4. The ceria-carbon-sulfur composite of claim 1, wherein the ceria-carbon-sulfur composite comprises the ceria-carbon composite and sulfur in a weight ratio of 1:9 to 9:1.

5. A positive electrode for a lithium-sulfur battery comprising the ceria-carbon-sulfur composite according to claim 1.

6. A lithium-sulfur battery comprising the positive electrode of claim 5; a negative electrode; a separator interposed between the positive electrode and the negative electrode; and an electrolyte.

* * * * *